Feb. 27, 1945.    H. A. SHABAKER    2,370,200
APPARATUS FOR PRODUCING A GEL PRODUCT
Filed June 19, 1941    2 Sheets-Sheet 1
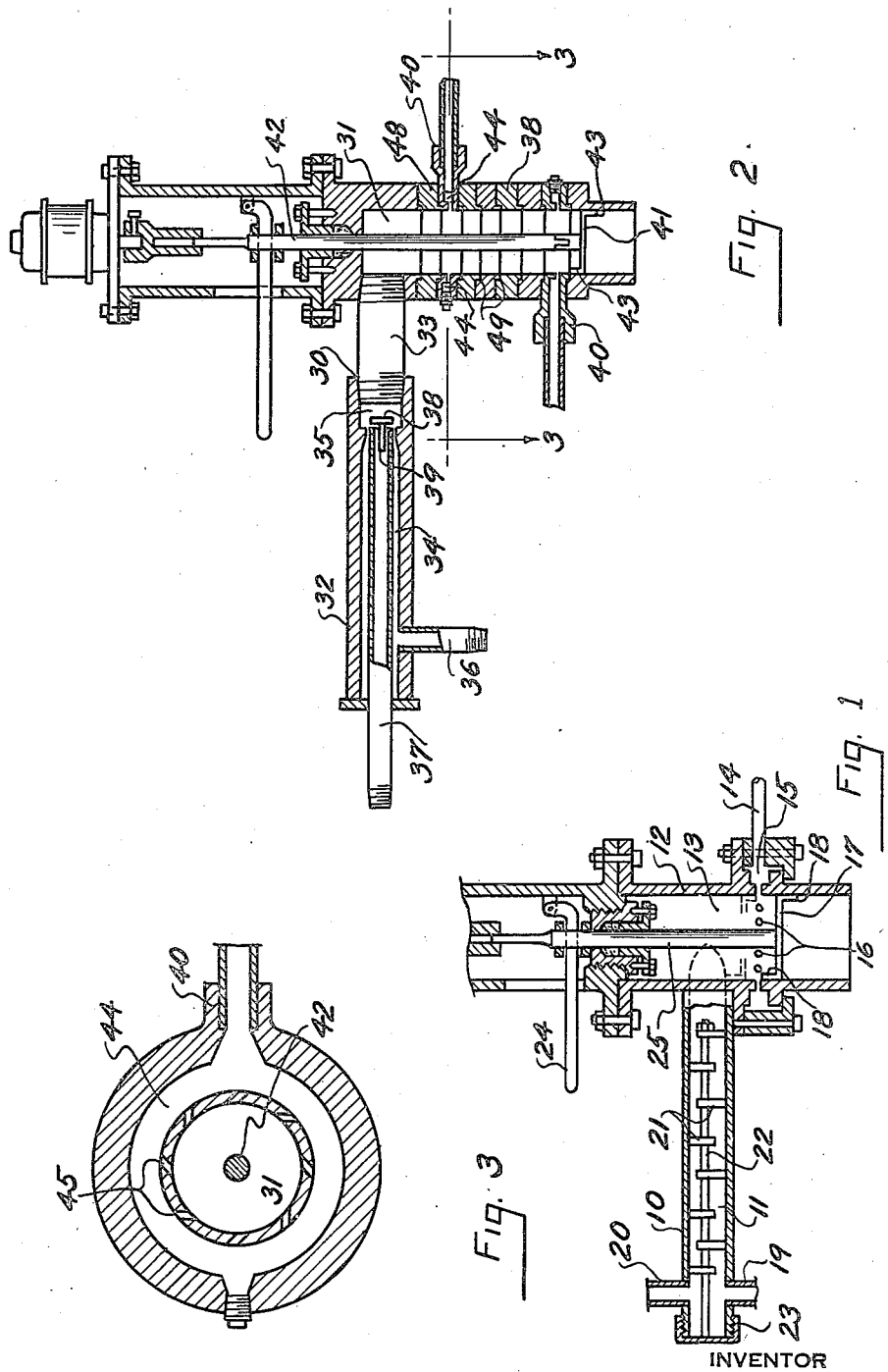
INVENTOR
HUBERT A. SHABAKER
BY
Ira L. Nickerson
ATTORNEY

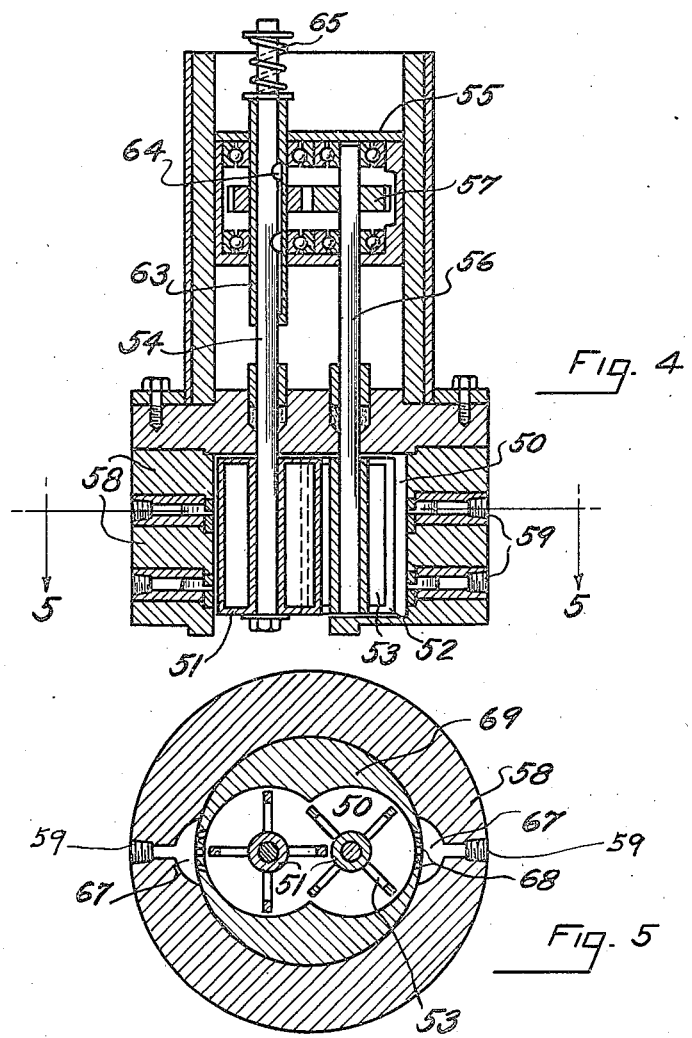

Patented Feb. 27, 1945

2,370,200

UNITED STATES PATENT OFFICE 2,370,200

APPARATUS FOR PRODUCING A GEL PRODUCT

Hubert A. Shabaker, Media, Pa., assignor to Houdry Process Corporation, Wilmington, Del., a corporation of Delaware Application June 19, 1941, Serial No. 398,731

4 Claims. (Cl. 252—359)

The present invention relates to the production of solids from reactant solutions and liquids. It is concerned mainly with improved method and apparatus for the uninterrupted and rapid manufacture of viscous or stiff masses such as all embracing gels or gelatinous precipitates which may be further processed, if desired, to reduce the same to products in hard or rigid forms. Such products are known to be highly adsorptive, and, for this reason, are valuable in the chemical industry as, or in contact masses for the chemical, catalytic or other treatment of fluids. It is well recognized that such products must be prepared under carefully selected reaction conditions in order to insure that the alkalinity, acidity or pH value of the final product is properly regulated to produce the results desired in treating solutions or liquids.

Prior methods for mixing solutions or liquids to form the viscous or stiff masses have been proposed. These methods include batch mixings which are adapted particularly for rapid setting or concentrated solutions but are objectionable in that it is necessary to use only small quantities of mixture and continuous methods which are objectionable due to clogging of the mixing and auxiliary equipment and also heretofore continuous methods have been usable generally with weak solutions. The continuous methods could be practically used only with reactant solutions which were in such dilute form that gel formation did not take place for a substantial period of setting time after the solutions were mixed. Apparently in these prior methods the solutions or liquids were not sufficiently or properly mixed at the instant of their contact to effect a rapid setting of the mixture. Also the equipment used in prior continuous processes for mixing concentrated reactant solutions acquired accumulations of gelatinous deposit on the mixing and auxiliary equipment so rapidly that flow through the equipment was seriously restricted even to the point of complete or substantially complete stoppage within very short periods.

The present invention is an improvement over that disclosed in Patent No. 2,232,737 issued February 25, 1941, to Albert G. Peterkin and Hubert A. Shabaker and is a continuation-in-part of patent application of Hubert A. Shabaker, Serial No. 349,794 for Preparation of contact masses, filed August 2, 1940. The method disclosed in this specification is claimed in my copending application Ser. No. 549,280, filed August 12, 1944.

One object of the present invention is to provide improved method and apparatus for treating reactant solutions particularly concentrated solutions to form solid or gel-like products therefrom rapidly and uninterruptedly. Another object is to provide improved apparatus for mixing the reactant solutions. Another object is to provide apparatus which permits varying the size of the mixing chamber for treating solutions of varying concentrations. Another object is to provide mixing apparatus which is self-cleaning to insure uninterrupted operation.

The invention involves contacting continuously within an enclosed mixing or reactant zone streams of reactant solutions or liquids of such predetermined concentrations and proportions that a viscous, stiff or gel-like product is quickly formed, and under such conditions of high velocity and turbulence that each stream becomes so disintegrated by violent mutual contact with another stream that it is completely and uniformly dispersed or diffused within and throughout another stream at substantially the instant of contact. The solutions of active ingredients of which it is desired to form the final product may be admitted to the reaction zone in various ways in order to effect a very intimate mixing of the solutions and the gel formation will be initiated almost at the instant of contact of the solutions. In order to further enhance the uniformity of the gel formation the mixture is then subjected to mechanical agitation prior to its emission from the reaction zone and the mechanical agitation is controlled in order to prevent a breaking down of the gel after it is formed. With some mixtures it is necessary to use a setting agent in order to effect the rapid gel formation and the desired setting agent is usually admitted to the reaction zone at a point close to or adjacent the means for effecting the mechanical agitation. The method of operation is continuous or uninterrupted from the time the solutions or liquids enter the reaction zone until the gel is formed and the apparatus used is such that the solutions of the active ingredients are supplied to one zone of the reaction chamber where they are intimately mixed and after mixture progress to another or setting zone where the mechanical agitation is effected with or without the aid of a setting agent to increase the rate of gel formation. The zone of operation may consist of one chamber or may comprise a plurality of communicating chambers. In the latter instance the active ingredients will be mixed in a primary mixing zone and from there passed in the mixed state to the setting zone or setting chamber where the mechanical agitating means will be disposed and also where the setting agent may be admitted. The mechanical agitating means may take various forms and in order to prevent the mixture as it is acquiring a gel state from adhering to the agitator or to the chamber walls, scraping means of various forms are provided which may be independent of or integral with the agitating means.

Concrete embodiments of the invention are disclosed in the accompanying drawings, in which:

Fig. 1 is a sectional view of one type of continuous reaction or mixing chamber;

Fig. 2 is a sectional view of a modified arrangement of the apparatus shown in Fig. 1;

Fig. 3 is an enlarged view of a part of the apparatus shown in Fig. 2;

Fig. 4 is a modified form of apparatus for carrying out the invention; and

Fig. 5 is a sectional view taken along the line 5—5 of Fig. 4.

Referring to Fig. 1 wherein is disclosed one form of apparatus for carrying out the invention, the reaction zone is formed by a horizontally disposed casing 10 providing a chamber 11 and the casing is secured to a vertically disposed casing 12 providing a chamber 13, which is in communication with chamber 11. One or more reaction solutions, for example, a solution of a soluble metal salt or other soluble metal compound or complex is admitted, preferably tangentially, as shown, to the chamber 13 at suitable pressure and velocity from the chamber 11. During its travel through chamber 13 provision is made for the injection into the solution under conditions including high velocity which produces great turbulence and instantaneous mixing, another stream of solution, supplied by line 14, which will react with the fluid in chamber 13 to form an amorphous gel or gelatinous precipitate. This second solution may be simply an acidic or alkaline coagulating or gelling agent for metal or oxide dissolved in the first solution or it may comprise one or more metals or oxides desired as a constituent of the finished product. The solution or fluid passing through line 14 is admitted to a manifold 15 surrounding a portion of the casing 12 and the manifold 15 is in communication with the chamber 13 through a plurality of high velocity jets or orifices 16 in the wall of the casing 12.

To insure a substantially instantaneous complete and uniform mixture of the reactant solutions the free velocity of chamber 13 may be reduced at or adjacent the point of contact of the streams of the reactant solutions entering from chamber 11 and line 14. For example, the central portion of the chamber opposite jets 16 may be filled by a conical, spherical or cylindrical dummy or filler members (not shown) to force the stream of solutions fed by line 14 through a restricted annulus at this point, thus reducing the distance which the jetted solution from orifices 16 must penetrate in order to reach all portions of the mixing zone.

During the first stages of gelling reactions the product often has marked adhesive properties and tends to build up on the walls of the reaction chamber to restrict or even stop flow therethrough. It has been discovered, however, that such impedance of flow is eliminated when the reacting mixture is subjected, during its flow through the reaction chamber to increase the mixing, to positive agitation in addition to that provided by contacting the streams of reactants. The additional agitation which may be initiated substantially at or immediately after the primary mixing is preferably mechanically induced, as for example by the use of one or more suitable motor driven propellers or other rotary mixing blades or rods of suitable design, such as indicated at 17, disposed in the reaction chamber at a selected point downstream from and preferably adjacent the zone of mixing. The effect of the induced agitation is to accelerate uniform diffusion of each solution within and throughout the mixture. The time of agitation, however, is critical. For best results it should be continued until the reactions in the moving mixture have reached an advanced stage but should not continue substantially beyond the time in which the agitated mixture sets to stiff all embracing form. If continued substantially beyond this time it either prevents formation of the desired stiff product, or, if such a product is formed, destroys its structure to produce, in either event, a fluid product which does not set and which is not susceptible of economical handling and/or processing. Accordingly, the extent of the agitation zone provided by blade 17 is so limited and the rate of flow of the reacting mixture through chamber 13 so controlled that the flowing mixture passes out of that zone before gel formation is complete. The actual time within which the mixing and agitation steps are completed depends upon a number of factors, including the chemical nature of the reactants, their concentration in the solutions and the alkalinity or acidity of the reacting mixtures. When quick setting reacting mixtures are formed, this time usually does not exceed 5 seconds and often is within the range of 0.01 second to 2 or 3 seconds. As shown in Fig. 1, the extent of the induced agitation zone may be defined by suitable extension members on a single mixing blade. Such extension members may be disposed between the center and ends of the blade but by preference there is at least one such member disposed adjacent to or in sliding engagement with the walls of chamber 13, as indicated, for example, by turned or upset ends 18—18 of blade 17, to effect removal of temporarily adhering gel deposits from the chamber walls. If desired, the extent of this zone may be defined by a plurality of mixing blades which may or may not have extensions thereon.

To facilitate handling of the reaction product chamber 13 preferably extends beyond the zone of induced agitation to provide for setting of the gel to its desired stiff form so that it is forced from the mixing head by the pressure of the stream of reacting solutions as a continuous body of definite shape, embracing all or substantially all the constituents of those solutions. The time allowed in the setting zone may equal or exceed by any desired extent the time within which gel formation becomes substantially complete. Usually, a few seconds, say, 5 or less, will suffice. In some instances, and particularly with quick gel forming solutions, a second, down to a tenth of a second or less, is enough time for the setting process. Since the set gel does not adhere to the walls of the reaction chamber, the only upper limit to the time allowed between the agitation step and discharge of the finished gel from the chamber 13 is that imposed by its resistance to flow through the reaction chamber and the pressure which it is desired to maintain on the solutions fed thereto. In order to provide constant flow conditions in the mixing and agitation steps it is preferred to utilize a reaction chamber and feed rates that provide sufficient excess time after agitation to create substantial back pressure, for example, ten pounds per square inch or more in the reaction chamber as up to 100 pounds.

The all-embracing gel discharging from the chamber 13 will be continuous and occupy substantially the entire chamber. In some instances, when it is preferred to process or handle smaller pieces, one or any desired number of cutting wires or blades or a screen of desired mesh (not shown) may be mounted in or adjacent the discharge end of chamber 13 and in the path of the gel flowing out of the same to divide the continuous column into any desired number of sections. Also, if desired, any known or desired oscillating or rotary knife or other cutting unit may be utilized to cut the gel thus divided into pieces of predetermined length.

As indicated above, two or more reactant solutions may be simultaneously admitted through either or both of chamber 11 and line 14. In some instances, two or more solutions so used, for example, a soluble silicate and soluble compound of aluminum or alumina may tend themselves to form a gel without the aid of a setting agent. However, in general, the solutions are preferably combined under such conditions, including concentration and acidity or alkalinity, that they form a slowly reacting mixture or a sol in which there is no substantial gel formation until gel production is accelerated by the addition of one or more reactants as by line 14. One suitable method of effecting the primary mixing of such reactants is illustrated in connection with chamber 11 which is shown provided with an inlet conduit 19 for one such solution and a second inlet conduit 20 for another. The mixing chamber 11 is provided with suitable baffles 21 to effect torturous movement and fairly uniform mixture of the two solutions before they enter the setting zone 13. The baffles 21 may be made either stationary or rotatable. After extended use, small quantities of such a sol, retained for example behind the mixing baffles, tend to develop adherent gel deposits which partially block chamber 11, and in some instances, to form small quantities of such deposit on the upper portion of the walls of the chamber 13. As shown, the baffles 21 may be arranged for quick demounting or removal from mixing chamber 11 as by mounting them on a spindle 22 attached, for example, to removable cap 23. To effect removal of prematurely formed gel deposits from the upper portions of the walls of chamber 13, mixing blade 17 may be movably mounted, for example, after the manner indicated, to reciprocate the blade through forked lever 24 connected to the blade by shaft 25 and periodically moved into engagement with the portions of the walls thus affected. When, as is exemplified by feeding a silica-alumina sol to chamber 11, operation of the apparatus is periodically interrupted for removal of prematurely formed deposit, continuous plant operation may be provided by using more than one apparatus, so that when one is being cleaned another can be in productive use.

The chamber 13 is illustrated in the drawings in vertical position for discharging the finished gel downwardly and the mixing blade 17 may be driven by a suitably mounted motor through shaft 25 extending downwardly through a stuffing gland into chamber 13. Although this is a particularly advantageous arrangement, it is by no means the only arrangement which provides excellent operation of the continuous gel forming step. On the contrary, the apparatus provides substantially as good operation when disposed in a horizontal or intermediate position or in the reverse vertical position.

In Fig. 2 is shown an apparatus generally like that of Fig. 1 but differing therefrom in details. The apparatus is made up of a reaction zone including a mixing zone indicated generally at 30 and a setting zone indicated generally at 31. The mixing zone is formed of an outer conduit 32 having an open end secured in communication with the chamber 31 through an extension 33 and an inner conduit 34 is secured in spaced relation with the outer conduit and has an open end spaced from the wall of chamber 31 and also positioned inwardly of the end of conduit 32, forming a mixing chamber indicated generally at 35. Inlets 36 and 37 are in communication with the outer and inner conduits respectively for supplying the reactant solutions for passage through the mixing chamber 35. The inner conduit is provided at its open end adjacent the chamber 35 with some means of retarding or restricting the flow of fluid to the chamber and, as indicated, the particular means shown comprises a deflecting plate 38 which is fixed in position through means of one or more arms 39. The plate is slightly spaced from the outlet end of the inner conduit so as to deflect a thin stream of reactant fluid at right angles, or substantially right angles, which will meet the flow of solution in the outer conduit and provide a thorough mixing of the solutions. With this arrangement it will be seen a thin sheet of fluid will pass to the chamber 35 from the outer conduit and a thin sheet will be deflected from the plate 38 from the inner conduit so that an instantaneous and intimate mixing of the solutions is effected. Various other arrangements could be used for providing the intimate mixing, for example, the inner conduit end would be closed and a series of apertures provided in the closed end to effect a spray of the solution from the inner conduit into the stream of fluid passing through the outer conduit. Or perforations could be provided in the side of the inner conduit to permit the solution from the inner conduit to bubble or flow slowly into the stream of solution passing through the outer conduit.

As indicated in Fig. 2, the setting chamber 31 is constructed in a manner to permit its length to be varied in size in order to adapt the apparatus for use when dealing with solutions of varying concentrations. If weaker solutions are used in the mixing zone more time will be required for setting of the mixture to form to a gel-like consistency, in which case a longer setting time will be required and consequently a longer path of travel through the setting zone from the primary mixing zone. The chamber 31 is made up of a plurality of cylindrical rings 48 which are provided with flanges 49 to permit them to be readily positioned together. Preferably one or more of the rings 48 may be provided with nozzles 40 for supplying other reactants to the mixture formed in the mixing zone 30. For example, the upper nozzle 40 may be used to supply solution containing an additional component to the mixture and the lower nozzle 40 may be used for supplying a setting agent when this is necessary. In this figure it will be seen the agitator 41 is detachably secured to shaft 42 to permit the use of varying types of agitators or agitators having longer or shorter scraping arms 43. In Fig. 3 the nozzle rings are shown in detail and are constructed to provide an annular chamber 44 which is cored in the ring and the chamber is in communication with its nozzle 40 for supplying the fluid for passage into the setting chamber through apertures 45 in the inner wall of chamber 44. A removable plug is provided for flushing out the chamber 44 as desired.

In Fig. 4 a modified form of apparatus for carrying out the invention is shown which comprises a reaction chamber indicated generally at 50, having disposed therein for mixing the solutions a pair of agitators 51 formed of blades 52 extending lengthwise of the chamber. As indicated in Fig. 4 and also in Fig. 5 the blades are provided with slots 53 to permit free movement of solutions through and around the blades to effect a thorough mixing of the solutions. For rotating the agitators 51 one is shown secured on a shaft 54, which may be driven by a motor (not shown) and the shaft extends through a gear box generally indicated at 55 provided with suitable bearings to assist rotation. A second shaft 56 is fixed to the other agitator 51 and is driven through spur gears 57 by the main driven shaft 54. As indicated in the drawings only two agitators are shown, but any suitable number may be utilized, depending upon the size of the reaction chamber and the liquids being treated. The agitators, as shown, rotate in a horizontal plane and the completed gel is removed at the lower end of the reaction chamber 50. The agitators may be arranged to operate in a vertical plane and the completed gel removed through the side wall of chamber 50.

The shaft 54 is provided with a splined sleeve 63, which is locked on the shaft 54 with a suitable key 64 and the shaft at its upper end is provided with a spring 65 to normally maintain the sleeve 63 and shaft 54 relatively fixed. When it is desired to clean the agitators 51 the shaft 54 may be pushed against the spring 65 to move the agitator out of the reaction zone. This, however, will seldom and may never be necessary, as the agitators 51 are arranged as clearly indicated in Fig. 5 to operate so that the blades of one agitator will effect a cleaning or scraping action with the blades of another agitator.

The reaction zone as heretofore mentioned comprises only one chamber made up of one or more rings 58, which are provided with nozzles 59 for supplying the desired number of solutions for forming the particular gel. In Fig. 4 the upper set of nozzles may be used for supplying the solutions containing the active ingredients for the gel and the upper part of the zone 50 would be in effect the primary mixing zone for the solutions and, as the mixture is formed and travels downwardly toward the bottom of zone 50, other active ingredients can be admitted through the lower nozzles or a setting agent, if desired, can be admitted through one of the nozzles and the lower part of the zone 50 would become the setting chamber or zone. When weak concentrations of the solutions are used it is desirable to have a rather long reaction zone in order that the materials are given time to reach the gel-like consistency before they pass out through the lower end of the zone 50. The zone 50 can, as heretofore mentioned, be utilized by having the agitators 52 arranged to rotate in a vertical plane and two or more solutions could be admitted, for example, to the right side of the zone 50 and the mixing effected as the solutions travel toward the left side of the chamber, where the mixture will set to form the gel and the gel then removed from the side wall of the chamber.

The nozzle rings 58, as clearly indicated in Fig. 5, are provided with a plurality of chambers 67 which communicate with each of the nozzles 59 and the chambers 67 are in turn placed in communication with the reaction zone 50 through a plurality of apertures 68 in bushing 69, which is bored to form the chamber 50.

The reaction zone of Fig. 4 may be used alone as a primary mixing zone and substituted for the mixing zones of Figs. 1 and 2 and other combinations of the various forms of the invention may be utilized within the scope of the invention, which is limited only by the scope of the appended claims.

The above described method and apparatus for producing gel-like materials from solutions or liquids finds particular application in the production of catalysts or contact materials of required compositions or activities to adapt them for their particular uses. It is recognized that catalysts of specified composition or known activity should be used with different reactants to produce best results, but in many instances the required composition of a synthetic catalyst or its activity have not been attained due to irregularities in production such as non-uniform or incomplete mixing of the constituents of the catalyst. For example, if it is important that a catalyst contain silica and alumina in an exact ratio, all portions of the product cannot be of this ratio unless all portions of the solutions are continuously supplied in this ratio and unless the mixing is thorough and setting time uniform so as to give absolutely uniform composition and control of all conditions of production, for otherwise the desired results may not be attained. The present invention provides mixing heads in which the points of admission of the solutions or liquids as well as the extent of the reacting chamber and the character of the agitation or mixing may be varied or adjusted to meet all conditions so as to deliver a final product which is uniform, of desired consistency, and in which the constituents are in proper ratio or proportion. In other words, it provides methods and apparatus for producing gels under a wide variety of conditions and with any degree of interdispersion of reactants with the assurance of ability to reproduce the same exactly in a continuous manner or from time to time.

What I claim is:

1. A device for producing a gel product from a plurality of solutions which comprises an elongate mixing chamber having an outlet end, separate inlet means for supplying streams of gel-forming solutions to the chamber, said inlet means being arranged to permit the streams of solutions to contact and flow together within the chamber toward the outlet end, means within the chamber for intimately mixing the solutions, a setting chamber in communication with the mixing chamber outlet end for continuously receiving the mixture, said setting chamber having a discharge end and scraping means therein to prevent the mixture from adhering to the chamber walls.

2. A device for forming a gel product from a plurality of solutions which comprises an elongate mixing chamber having an outlet end, separate inlet means for supplying streams of gel-forming solutions to the chamber, said inlet means being arranged to permit the streams of solutions to contact and flow together within the chamber toward the outlet end, means within the chamber for intimately mixing the solutions, a setting chamber in communication with the mixing chamber outlet end for continuously receiving the mixture, an inlet in the setting chamber for supplying a setting agent to the mixture to quickly produce a gel, and scraping means within the setting chamber to prevent the gel from adhering to the setting chamber walls.

3. A device for forming a gel product from a plurality of solutions which comprises concentrically disposed outer and inner conduits forming a mixing chamber, inlet means for supplying a reactant solution to each conduit for passage through the outlets of each conduit, deflecting means at the outlet of one of the conduits for directing the stream of solution therefrom into the stream of solution of the other conduit to effect a thorough mixing of the solutions, a setting chamber in communication with and adapted to receive the mixture directly from the mixing device, and an inlet for supplying a setting agent to the setting chamber to effect a quick setting of the mixture to the gel state and scraping means in the setting chamber to prevent the mixture from adhering to the chamber walls.

4. A device for forming a gel product from a plurality of solutions which comprises an elongate mixing chamber having an outlet end, separate inlet means for supplying streams of gel-forming solutions to the chamber, said inlet means being positioned to permit the streams of solutions to intermix and flow together within the chamber toward the outlet end, a setting chamber in communication with the mixing chamber outlet end for continuously receiving the mixture, said setting chamber including an annular chamber having an inner and outer wall, said outer wall being apertured for supplying a setting agent to the annular chamber and said inner wall being apertured for directing the setting agent to the mixture from the annular chamber.

HUBERT A. SHABAKER.